US009292596B2

(12) United States Patent  (10) Patent No.: US 9,292,596 B2
Mochizuki et al.  (45) Date of Patent: Mar. 22, 2016

(54) RELEVANCE-BASED INFORMATION PROCESSING

(71) Applicant: International Business Machines Corporation, Armonk, NY (US)

(72) Inventors: Tomoka Mochizuki, Yamato (JP); Lianzi Wen, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 14/050,743

(22) Filed: Oct. 10, 2013

(65) Prior Publication Data

US 2014/0149431 A1  May 29, 2014

(30) Foreign Application Priority Data

Nov. 28, 2012  (JP) ................. 2012-260261

(51) Int. Cl.
 *G06F 17/30* (2006.01)
(52) U.S. Cl.
 CPC .... *G06F 17/30648* (2013.01); *G06F 17/30011* (2013.01)
(58) Field of Classification Search
 None
 See application file for complete search history.

(56) References Cited

U.S. PATENT DOCUMENTS

2003/0051212 A1  3/2003  Narahara

FOREIGN PATENT DOCUMENTS

| JP | H1011458 A | 1/1998 |
|---|---|---|
| JP | 2003085204 A | 3/2003 |
| JP | 2005025550 A | 1/2005 |
| JP | 2008217087 A | 9/2008 |
| JP | 2009003553 A | 1/2009 |
| JP | 2011008523 A | 1/2011 |
| JP | 2011145901 A | 7/2011 |

OTHER PUBLICATIONS

Partial Translation of International Search Report dated Dec. 3, 2013; 1 page.
T. Watanabe, et al., "Application of Relationships Derived from Access Logs to Retrieve Files," IPSJ SIG Technical Reports, 2007, 07, 02, vol. 2007, No. 65; pp. 503-508. (Abstract Only).

*Primary Examiner* — Jason Liao
(74) *Attorney, Agent, or Firm* — Cantor Colburn LLP

(57) ABSTRACT

Embodiments relate to relevance-based information processing. An aspect includes storing a history of display operations performed by a user on a first electronic file. Another aspect includes inputting display operations into the stored history performed by a user on the first electronic file. Another aspect includes calculating, using a plurality of calculating methods, a plurality of degrees of relevance of a second electronic file to the first electronic file based on the stored history. Another aspect includes calculating a synthesized degree of relevance by synthesizing the plurality of degrees of relevance of the second electronic file to the first electronic file. Another aspect includes displaying an input region on a display for inputting display operations on the first electronic file, and automatically displaying the second electronic file based on the synthesized degree of relevance of the second electronic file to the first electronic file exceeding a predetermined threshold.

15 Claims, 16 Drawing Sheets

| Number | Time | Folder A | File B | File C | File D | File E | Corresponding User Operation |
|---|---|---|---|---|---|---|---|
| 1 | 8:00:00 | open, 100% | | | | | ... Open Folder A |
| 2 | 8:20:00 | 87% | open, 100% | | | | ... Open File B |
| 3 | 8:25:00 | 33% | 89% | open, 100% | | | ... Open File C |
| 4 | 8:28:00 | active, 100% | 77% | 33% | | | ... Activate Folder A |
| 5 | 8:28:10 | 100% | 85% | 0% | | | ... Move Location of Folder A |
| 6 | 8:30:00 | close, 0% | 100% | 93% | | | ... Close Folder A |
| 7 | 8:45:00 | | 0% | 73% | open, 100% | | ... Open File D |
| 8 | 9:00:00 | | 0% | close, 0% | 100% | | ... Close File C. |
| 9 | 9:05:00 | | active, 100% | | 50% | | ... Activate File B |
| 10 | 9:20:00 | | 100% | | 17% | open, 100% | ... Open File E |
| 11 | 9:25:00 | | close, 0% | | 67% | 100% | ... Close File B |
| 12 | 9:35:00 | | | | 100% | close, 0% | ... Close File E |
| 13 | 9:45:00 | | | | close, 0% | | ... Close File D |

| No. | Address | Execution Start Time | File/Folder Simultaneously Displayed in Foreground | Subsequently Opened File/Folder |
|---|---|---|---|---|
| xx1 | C:\desktop\FolderA | 2012/0x/xx, 08:00:00 | {FileB:0:05:00, 0:02:00} | {FileB} |
| xx2 | C:\desktop\FileB | 2012/0x/xx, 08:20:00 | {FolderA:0:05:00, 0:02:00}, {FileC:0:03:00, 0:15:00}, {FileD:0:20:00}, {FileE:0:05:00} | {FileC}, {FileD} |
| xx3 | C:\desktop\FileC | 2012/0x/xx, 08:25:00 | {FileB:0:03:00, 0:15:00}, {FileD:0:15:00} | {FileD} |
| xx4 | C:\desktop\FileD | 2012/0x/xx, 08:45:00 | {FileC:0:15:00}, {FileB:020:00}, {FileE:0:10:00} | {FileE} |
| xx5 | C:\desktop\FileE | 2012/0x/xx, 09:20:00 | {FileB:0:05:00}, {FileD:0:15:00} | |
| ... | ... | ... | ... | ... |

(b)

| No. | Address | Execution Start Time | File/Folder Simultaneously Displayed in Foreground | Subsequently Opened File/Folder |
|---|---|---|---|---|
| yyy | C:\desktop\FileB | 2012/0x/yy, 12:03:00 | {FolderA:0:10:00} | - |
| xx2 | C:\desktop\FileB | 2012/0x/xx, 08:20:00 | {FolderA:0:05:00, 0:02:00}, {FileC:0:03:00, 0:15:00}, {FileD:0:20:00}, {FileE:0:05:00} | {FileC}, {FileD} |
| zzz | C:\desktop\FileB | 2012/0x/xx, 14:20:00 | {FileC:0:05:00}, {FileD:0:10:00} | {FileC} |

| No. | Address | Execution Start Time | Simultaneously Opened File/Folder | Subsequently Opened File/Folder |
|---|---|---|---|---|
| xx1 | C:¥desktop¥FolderA | 2012/0x/xx, 08:00:00 | {FileB:0:10:00}, {FileC:0:05:00} | {FileB}, {FileC} |
| xx2 | C:¥desktop¥FileB | 2012/0x/xx, 08:20:00 | {FolderA:0:10:00}, {FileC:0:35:00}, {FileD:0:40:00}, {FileE:0:05:00} | {FileC}, {FileD} |
| xx3 | C:¥desktop¥FileC | 2012/0x/xx, 08:25:00 | {FolderA:0:05:00}, {FileB:0:35:00}, {FileD:0:15:00} | {FileD} |
| xx4 | C:¥desktop¥FileD | 2012/0x/xx, 08:45:00 | {FileB:0:40:00}, {FileC:0:15:00}, {FileE:0:15:00} | {FileE} |
| xx5 | C:¥desktop¥FileE | 2012/0x/xx, 09:20:00 | {FileB:0:05:00}, {FileD:0:15:00} | |
| ... | ... | ... | ... | ... |

(b)

| No. | Address | Execution Start Time | Simultaneously Opened File/Folder | Subsequently Opened File/Folder |
|---|---|---|---|---|
| yyy | C:¥desktop¥FileB | 2012/0x/yy, 12:03:00 | {FolderA:1:10:00} | — |
| xx2 | C:¥desktop¥FileB | 2012/0x/xx, 08:20:00 | {FolderA:0:10:00}, {FileC:0:35:00}, {FileD:0:40:00}, {FileE:0:05:00} | {FileC}, {FileD} |
| zzz | C:¥desktop¥FileB | 2012/0x/xx, 14:20:00 | {FileC:1:10:00}, {FileD:0:20:00} | {FileC} |

| No. | Address | Time Became Active | Subsequently Active File/Folder |
|---|---|---|---|
| xx1 | C:\desktop\FolderA | 2012/0x/xx, 08:00:00 | [FileB], [FileC] |
| xx2 | C:\desktop\FileB | 2012/0x/xx, 08:20:00 | [FileC], [FolderA] |
| xx3 | C:\desktop\FileC | 2012/0x/xx, 08:25:00 | [FolderA], [FileB] |
| xx4 | C:\desktop\FolderA | 2012/0x/xx, 08:28:00 | [FileB], [FileD] |
| xx5 | C:\desktop\FileB | 2012/0x/xx, 08:30:00 | [FileD] |
| xx6 | C:\desktop\FileD | 2012/0x/xx, 08:45:00 | [FileB], [FileE] |
| xx7 | C:\desktop\FileB | 2012/0x/xx, 09:05:00 | [FileE], [FileD] |
| xx8 | C:\desktop\FileE | 2012/0x/xx, 09:20:00 | [FileD] |

...

(b)

| No. | Address | Time Became Active | Subsequently Active File/Folder |
|---|---|---|---|
| xx2 | C:\desktop\FileB | 2012/0x/xx, 08:20:00 | [FileC], [FolderA] |
| xx5 | C:\desktop\FileB | 2012/0x/xx, 09:20:00 | [FileD] |
| xx7 | C:\desktop\FileB | 2012/0x/xx, 09:05:00 | [FileE], [FileD] |
| xxx | C:\desktop\FileB | 2012/0x/xx, 14:20:00 | [FileC] |

FIG. 11

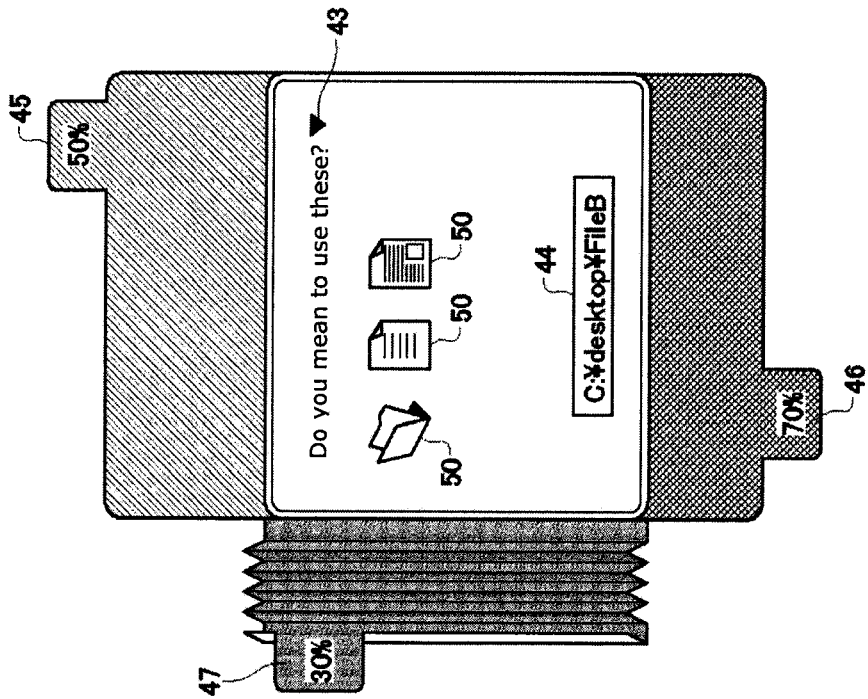
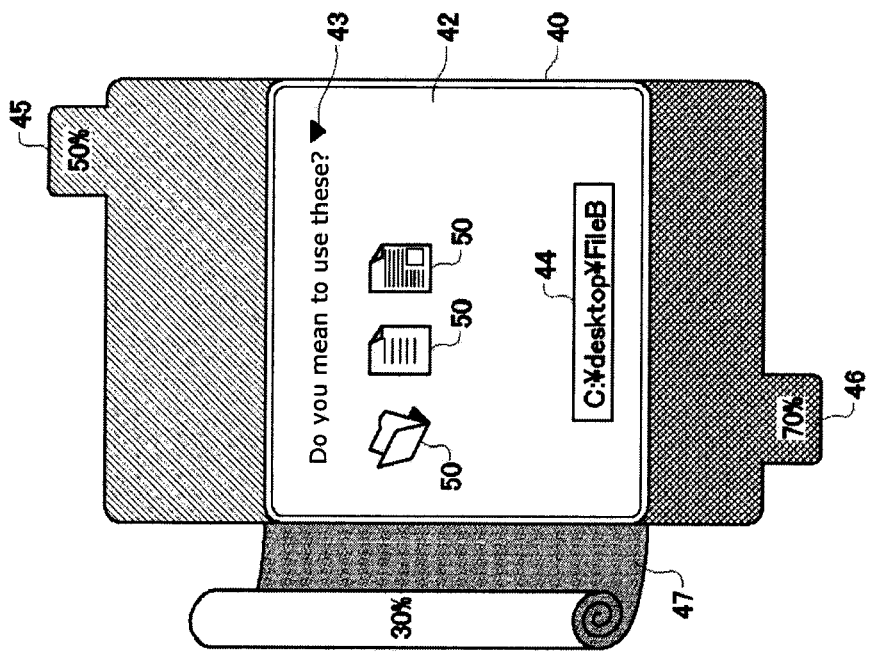
FIG. 15

US 9,292,596 B2

RELEVANCE-BASED INFORMATION PROCESSING

PRIORITY

This application claims the benefit of priority under 35 U.S.C. §119 to Japanese Patent Application No. 2012-260261, filed on Nov. 28, 2012, which is herein incorporated by reference in its entirety.

BACKGROUND

This disclosure relates generally to information processing, and more particularly to relevance-based information processing.

In an information processing system, the times that an electronic file was open are recorded. A pair of electronic files that are simultaneously open for a relatively long period of time may be determined to be highly relevant to each other, and another electronic file may be automatically opened when it is highly relevant to an electronic file of interest to a user. However, determination of the relevance of electronic files to each other based on when the electronic files were open may not allow the relevance of the two electronic files to each other to be evaluated accurately.

SUMMARY

Embodiments include a method, system, and computer program product for relevance-based information processing. An aspect includes storing a history of display operations performed by a user on a first electronic file. Another aspect includes inputting display operations into the stored history performed by a user on the first electronic file. Another aspect includes calculating, using a plurality of calculating methods, a plurality of degrees of relevance of a second electronic file to the first electronic file based on the stored history. Another aspect includes calculating a synthesized degree of relevance by synthesizing the plurality of degrees of relevance of the second electronic file to the first electronic file. Another aspect includes displaying an input region on a display for inputting display operations on the first electronic file, and automatically displaying the second electronic file based on the synthesized degree of relevance of the second electronic file to the first electronic file exceeding a predetermined threshold.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 5 shows an example of a display operation history stored in the history storage unit according to an embodiment.

FIG. 7 shows an example of a first table created in response to the situation in FIG. 6 according to an embodiment.

FIG. 9 shows an example of a second table created in response to the situation in FIG. 8 according to an embodiment.

FIG. 11 shows an example of a third table created in response to the situation in FIG. 10 according to an embodiment.

FIG. 15 shows an example in which the ratio display panel has been collapsed according to an embodiment.

DETAILED DESCRIPTION

Figure 1:
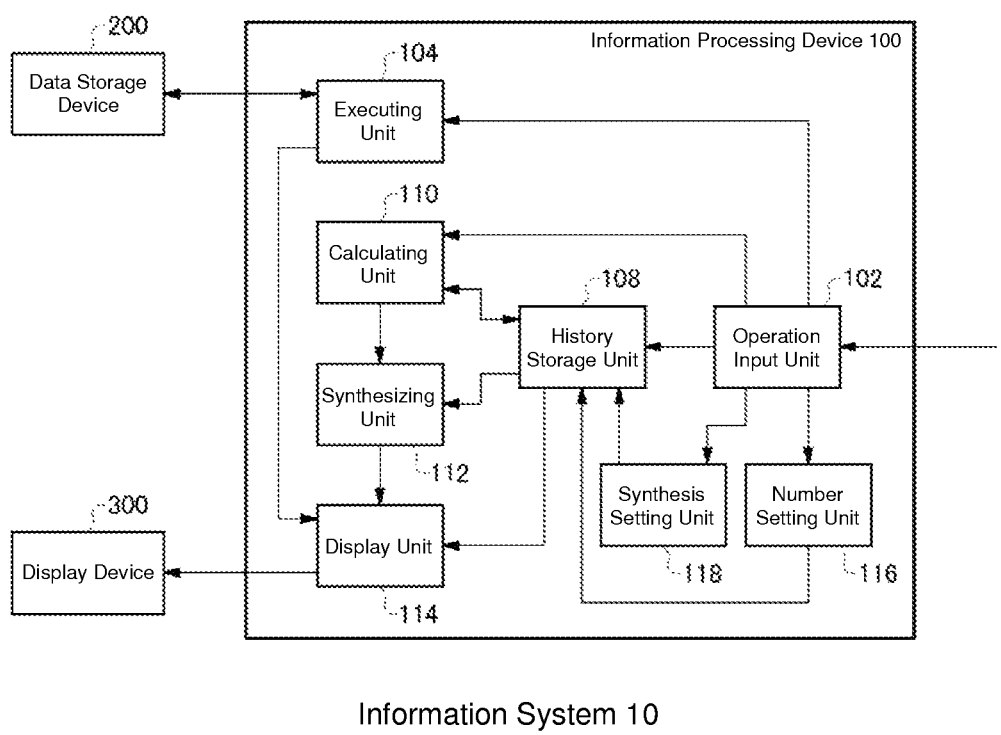
FIG. 1 shows an information system according to an embodiment.

Embodiments of relevance-based information processing are provided, with exemplary embodiments being discussed below in detail. FIG. 1 shows the configuration of the information system 10 according to an embodiment. When the user opens a window corresponding to one data set, the information system 10 references the degree of relevance of other data units to the one data unit, and presents the highly relevant data to the user.

According to an embodiment, data unit refers to at least one of the files and folders in a filing system. Also, according to an embodiment, a window corresponding to a data unit may be a window displayed in a display screen by the operating system (OS) when a file or folder is opened. Data units may also include at least one of the website links, files and folders stored in a computer outside of the information processing device 100.

The information system 10 may be a computer such as a personal computer, a mobile phone, or a mobile terminal. The information system 10 includes an information processing device 100, a data storage device 200 such as a hard disk, and a display device 300 such as a liquid crystal display (LCD).

The information processing device 100 retrieves display operations or instructions from the user to display data, and executes information processing based on the display operations. The information processing device 100 then stores the results of the information processing in the data storage device 200, and displays the results on the display device 300. For example, the information processing device 100 executes a display editing process based on a word processing application, spreadsheet application or some other application, and displays the results on the display device 300. The information processing device 100 has an operation input unit 102, executing unit 104, history storage unit 108, calculating unit 110, synthesizing unit 112, display unit 114, number setting unit 116, and synthesis setting unit 118.

The operation input unit 102 has a keyboard and/or touch panel, and is used by the user to input display operations for data. For example, the operation input unit 102 is used by the user to input display operations to open or close files or folders, display operations to render an open file or folder active, and display operations to change the size and/or location of the window for an open file or folder. In the information processing device 100, the operation input unit 102 is used by the user to input settings related to the presentation of highly relevant data.

When the operation input unit 102 has been used by the user to input a display operation for a file or folder, the history of the display operation is stored in the history storage unit 108. Also, when the operation input unit 102 has been used by the user to input a display operation for data, the file or folder that is the target of the operation is supplied along with instructions for the operation to the executing unit 104 and calculating unit 110. In addition, the operation input unit 102 supplies settings entered by the user to the number setting unit 116 or synthesis setting unit 118.

The executing unit 104 acquires the display operation from the user for one data unit via the operation input unit 102, and processes the one data unit according to the display operation. For example, when a display operation has been acquired to open a file or folder, the executing unit 104 acquires the data for the file or folder from the data storage device 200, and executes the processing for opening the file or folder. The processing for opening the file or folder is started by the application associated with the file type. This includes other types of processing, such as editing the display of the file and displaying lower level files and folders located inside the folder.

When a display operation has been acquired to render a file or folder active, the executing unit 104 executes processing to render active the window in which the file or folder is displayed. When a display operation has been acquired to change the size and/or location of the window in which a file or folder is displayed, the executing unit 104 executes processing to change the size and/or location of the window in which a file or folder is displayed. The executing unit 104 also outputs the execution results from the processing to the display unit 114. The executing unit 104 may also store the execution results from the processing in the data storage device 200.

The history storage unit 108 stores the history of display operations from the user for data supplied via the operation input unit 102. The history storage unit 108 may be the primary storage device or a secondary storage device of the information processing device 100. Alternatively, the history storage unit 108 may be provided inside the data storage device 200.

The calculating unit 110 uses a plurality of methods to calculate the degree of relevance of other data units to the one data unit inputted by a user operation into the operation input unit 102. These calculations are performed based on the history stored in the history storage unit 108 to obtain a plurality of degrees of relevance. In the first of the plurality of calculating methods, the calculating unit 110 may calculate a first degree of relevance between the one data unit and other data units based on the simultaneous display time during which windows corresponding to a plurality of data units were simultaneously displayed in the foreground of the display screen according to user operations. In this way, the calculating unit 110 can deduce that any file or folder that was simultaneously displayed in the foreground of the display screen along with the file or folder opened by the user is data with a high degree of relevance.

In the second of the plurality of calculating methods, the calculating unit 110 may calculate a second degree of relevance between one data unit and other data units based on the simultaneous operating time during which a plurality of windows corresponding to a plurality of data units were simultaneously rendered operable by user operations. The time that a window corresponding to a data unit was rendered operable may correspond to the time during which a file or folder was open, and the window was open on the desktop, the open window was hidden in the background, or the open window was minimized.

In other words, the calculating unit 110 calculates the second degree of relevance based on the time during which two files or folders were simultaneously open. In this way, the calculating unit 110 can deduce that any file or folder that was simultaneously open along with the file or folder opened by the user is data with a high degree of relevance.

In the third of the plurality of calculating methods, the calculating unit 110 may calculate a third degree of relevance between one data unit and other data units based on data corresponding to a window that was rendered active after the window corresponding to the first data unit was rendered active. For example, the calculating unit 110 calculates the third degree of relevance using data corresponding to a predetermined number of subsequently activated windows used to manipulate data after the window used to manipulate the one data unit.

In this way, the calculating unit 110 can deduce that any file or folder rendered active after a file or folder rendered active by a user display operation is data with a high degree of relevance. The calculating unit 110 supplies a plurality of calculated degrees of relevance to the synthesizing unit 112.

The synthesizing unit 112 synthesizes the plurality of degrees of relevance calculated by the calculating unit 110 using a plurality of calculating methods to calculate a synthesized degree of relevance to other data. For example, the synthesizing unit 112 acquires synthesis ratios for the plurality of degrees of relevance from the history storage unit 108 to calculate a synthesized degree of relevance, multiplies each of the degrees of relevance by the corresponding synthesis ratio to obtain a weighting, and then synthesizes a synthesized degree of relevance of the one data unit to the other data units. The synthesizing unit 112 supplies the synthesized degree of relevance to the display unit 114.

The display unit 114 displays a plurality of superimposable windows corresponding to the plurality of data units inputted using display operations. For example, the display unit 114 acquires from the executing unit 104 the execution results that were outputted by the executed application when a file or folder was opened (for example, a screen outputted by the application), and displays a window for the file or folder based on the execution results.

When the synthetic degree of relevance exceeds a predetermined standard, the display unit 114 displays on the display device 300 an input region in which icons or names of other highly relevant data units are displayed. For example, the display unit 114 displays in a region of the display device 300 file or folder icons of files or folders with other data units whose synthetic degree of relevance exceeds a predetermined standard. In this way, the display unit 114 displays other files and folders which are highly relevant to the file or folder initially opened by the user on the display device 300 as candidates for the file or folder to be opened next.

A display operation is inputted by the user using an icon for another data unit via the operation input unit 102. In this way, the executing unit 104 can execute the file or folder selected by the user among the other highly relevant files and folders.

The number setting unit 116 sets the number of windows to be used in the third degree-of-relevance calculation based on operations performed by the user. The number setting is inputted by the user via the operation input unit 102 for the third degree-of-relevance calculated by the calculating unit 110, and the number setting unit 116 stores the acquired number setting in the history storage unit 108. The calculating unit 110 can acquire the stored number setting from the history storage unit 108.

The synthesis setting unit 118 sets the synthesizing ratios for the plurality of degrees of relevance based on user operations so that the synthesizing unit 112 can calculate the synthesized degree of relevance. For example, the user inputs a synthesizing ratio via the operation input unit 102, and the acquired synthesizing ratio is stored in the history storage unit 108.

In the information processing device 100, the history storage unit 108 stores the history of display operations inputted by the user using the operation input unit 102, the calculating unit 110 calculates a plurality of degrees of relevance of other files and folders to the file or folder opened by the user based on this history, and the synthesizing unit 112 synthesizes the plurality of degrees of relevance into a synthesized degree of relevance. In this way, the information processing device 100 of the present embodiment can propose highly relevant files and folders to the user as the next file or folder to be opened based on multiple perspectives related to the file or folder initially opened by the user.

Figure 2:
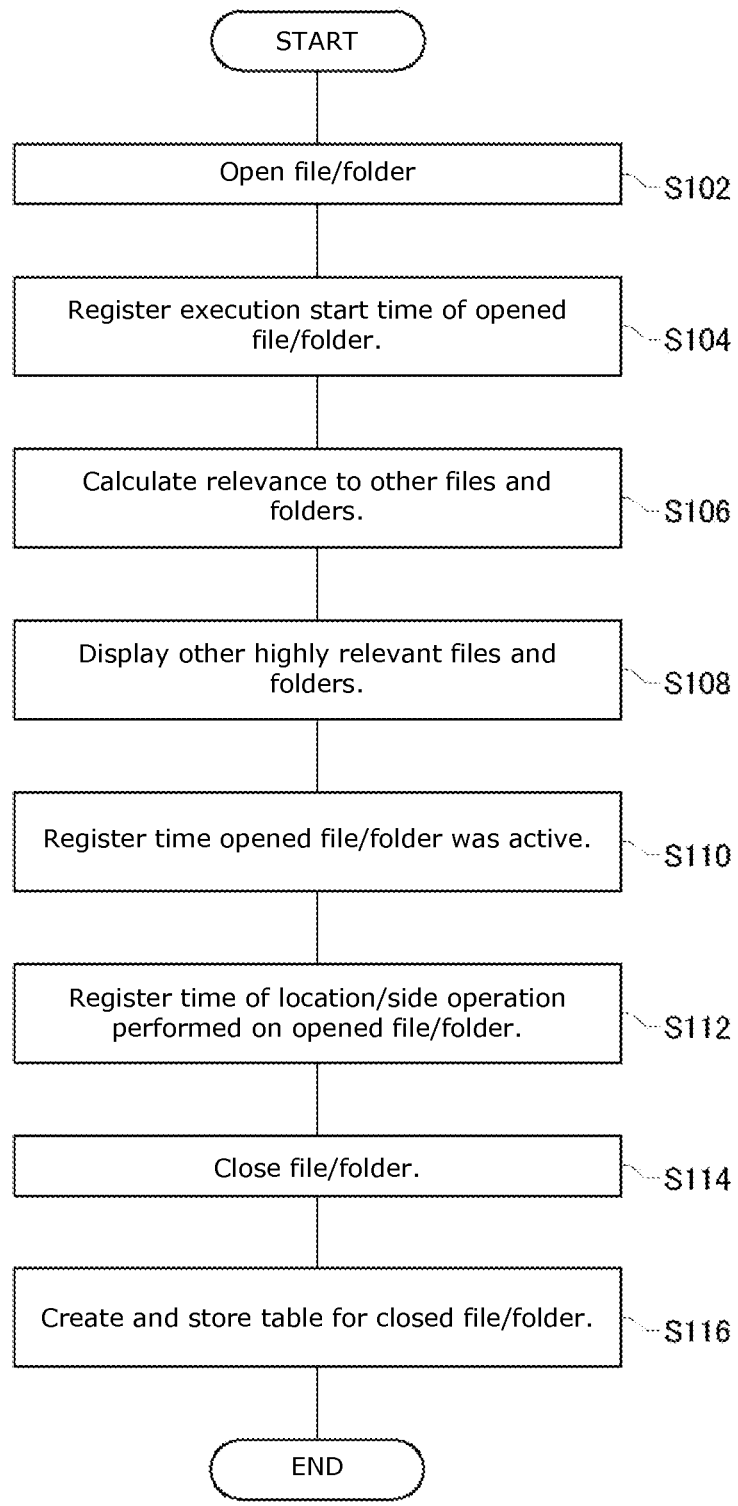
FIG. 2 shows a flowchart of processing for the information system according to an embodiment.

FIG. 2 shows a processing flow for the information system 10 according to an embodiment. According to an embodiment, the information system 10 of FIG. 1 executes the method of FIG. 2 from block S102 to block S116.

First, in block S102, the user uses the operation input unit 102 to input a display operation to open a file or folder. The operation input unit 102 supplies the file or folder and operational details (for opening the file or folder) to the executing unit 104. In response, the executing unit 104 reads the file or folder from the data storage device 200, executes the file or folder, and supplies the execution results to the display unit 114.

The display unit 114 displays the execution results on the display device 300. In other words, the display unit 114 displays on the display device 300 a window for the file or folder opened by the user. The operation input unit 102 also supplies the file or folder and the operational details (for opening the file or folder) to the calculating unit 110.

In block S104, the operation input unit 102 stores in the history storage unit 108 the time the operation input unit 102 opened the file or folder in block S102 as the file or folder execution start time. The operation input unit 102 also stores in the history storage unit 108 display ratios for displaying in the foreground both the window for the file or folder and windows for displaying previously opened files and folders.

Here, the display ratios for displaying file and folder windows in the foreground stored in the history storage unit 108 are ratios for the entire window excluding portions hidden by other windows or portions that extend beyond the display screen based on results inputted by the user. When other files and folders have not been opened, the initial display ratio for the opened file or folder is usually 100%.

Next, in block S106, the calculating unit 110 calculates the degree of relevance of other files and folders to the file or folder opened by the user. More specifically, the calculating unit 110 calculates a first, second and third degree of relevance of other files and folders to the file or folder opened by the user using a first, second and third calculating method.

The specific methods used to calculate these degrees of relevance will be explained below.

The calculating unit 110 supplies the calculated first, second and third degrees of relevance to the synthesizing unit 112. The synthesizing unit 112 acquires synthesizing ratios for the degrees of relevance from the history storage unit 108 to calculate a synthesized degree of relevance. The synthesizing unit 112 synthesizes results in which the first, second and third degrees of relevance have been multiplied by their corresponding synthesizing ratio. A synthesized degree of relevance is calculated for each of the other files and folders to the file or folder opened by the user. The synthesizing unit 112 supplies the synthesized degrees of relevance for the other files and folders to the display unit 114.

Next, in block S108, the display unit 114 displays the highest degrees of relevance or the other files and folders on the display device 300. More specifically, when the synthesized degree of relevance of other files and folders exceeds a predetermined standard, an input region is displayed for displaying the icons of the other files and folders, and the other files and folders are displayed in the display region.

The predetermined standard used by the display unit 114 to determine whether an icon of another file or folder is to be displayed may be a threshold value for the synthesized degree of relevance. Here, the display unit 114 may display in the input region all files and folders whose synthesized degree of relevance exceeds the threshold value.

The display unit 114 may also use, as the predetermined standard, synthesized degrees of relevance for other files and folders listed in descending order from the highest degree of relevance. In this case, the display unit 114 displays in the input region a predetermined number of files and folders with the highest degrees of relevance. Here, when the user inputs a display operation to open another file or folder displayed in the input region, the operation input unit 102 executes the same process as the one in block S102 to open the other file or folder.

In block S110, when the user renders the opened file or folder or another open file or folder active, the operation input unit 102 stores the activation time in the history storage unit 108. After activation, the operation input unit 102 also stores the display ratio of all windows for open files and folders displayed in the foreground in the history storage unit 108.

In block S112, when the location or size of the opened file or folder or some other open file or folder is changed by a user operation, the operation input unit 102 stores the change time in the history storage unit 108. After the change operation, the operation input unit 102 also stores in the history storage unit 108 the display ratio of the windows for all open files and folders displayed in the foreground.

In block S114, the operation input unit 102 any operation inputted by the user to close an open file or folder. The operation input unit 102 also supplies the opened file or folder and the operational details (for closing the file or folder) to the executing unit 104.

In response, the executing unit 104 ends processing of the file or folder. The display unit 114 displays on the display device 300 a screen with the file or folder closed. The time that the file or folder was closed is stored by the operation input unit 102 in the history storage unit 108.

In block S116, the calculating unit 110 creates a table related to the closed file or folder based on the history stored in the history storage unit 108, and stores the created table in the history storage unit 108. The table stored in the history storage unit 108 is used when calculating the plurality of degrees of relevance in block S106. The calculating unit 110 may create a first through third table used by the calculating methods for the first through third degrees of relevance.

In blocks S102 through S116, the information system 10 according to an embodiment stores a history of display operations performed by the user on files and folders, calculates the degree of relevance of other files and folders to a file or folder opened by the user based on this history, and presents the other files and folders with a high degree of relevance to the user.

Figure 3:
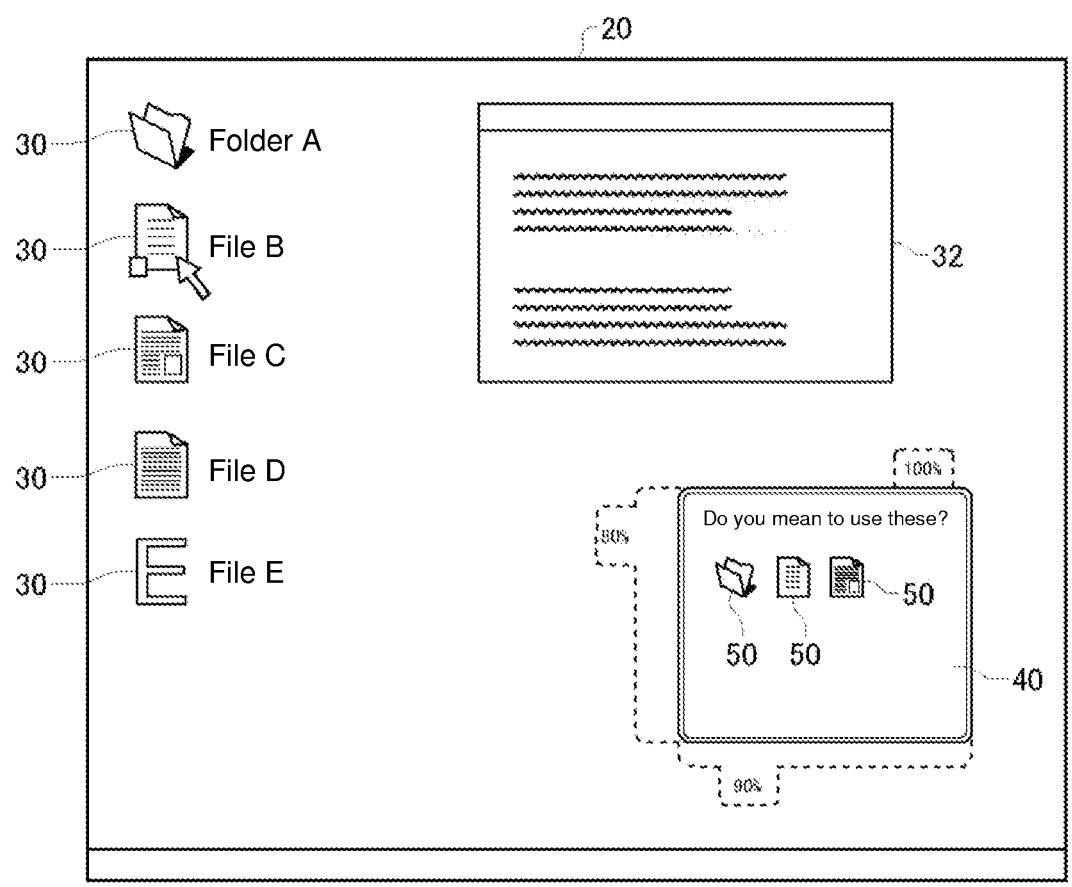
FIG. 3 shows an example of a display on the display device according to an embodiment.

FIG. 3 shows an example of a display on the display device 300 according to an embodiment. Icons 30 for Folder A, File B, File C, File D and File E are displayed on the display screen 20 of the display device 300.

In the information processing device 100, executing unit 104 opens File B when the user double-clicks on the icon for File B. In response, the display unit 114 displays a window 32 for file B on the display screen 20. As window 32 is being displayed or after window 32 has been displayed, the display unit 114 also displays an input region 40 in the lower right-hand corner of the display screen 20 of the display device 300 for inputting operations to open another file or folder.

The display unit 114 displays in the input region 40 icons 50 of Folder A, File D and File C whose synthesized degree of relevance to File B exceed a predetermined standard. Here, when the information processing device 100 receives from the user a display operation to open Folder A, File D or File C (by double-clicking on the icon 50 for Folder A, File D or File C), the display unit 114 displays a window for the open file or folder on the display screen 20. In the example in FIG. 3, all of the files and folders are on the same hierarchical level (the desktop). However, the files and folders may also be on different levels.

Figure 4:
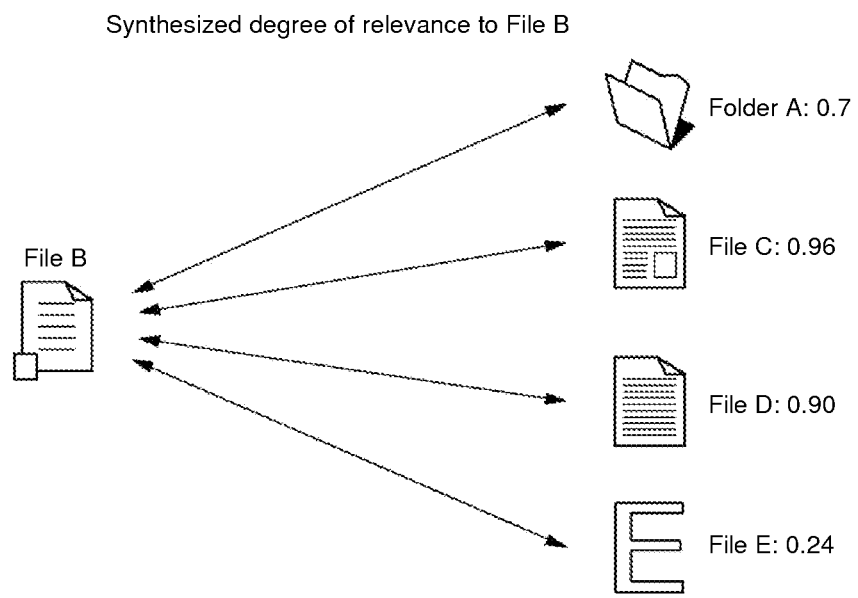
FIG. 4 shows an example of the synthesized degree of relevance of other files and folders to File B according to an embodiment.

FIG. 4 shows an example of the synthesized degree of relevance of other files and folders to File B. In this example, Folder A has a 0.70 synthesized degree of relevance to File B, File C has a 0.96 synthesized degree of relevance to File B, File D has a 0.90 synthesized degree of relevance to File B, and File E has a 0.24 synthesized degree of relevance to File B.

When, for example, the synthesized degree of relevance standard for display of data by the display unit 114 is 0.5 or greater, the display unit 114 displays icons 50 for Folder A, File C and File D in the input region 40. When the standard is the three highest synthesized degrees of relevance of other files and folders to File B, the display unit 114 displays icons 50 for Folder A, File C and File D in the input region 40.

FIG. 5 shows an example of a display operation history stored in the history storage unit 108. The table on the left-hand side of the figure shows the history of thirteen display operations performed by a user which are stored in the history storage unit 108, and the right-hand side of the figure shows the user display operations corresponding to the history.

For example, when Folder A is opened at 8:00:00, the operation input unit 102 stores the history shown in No. 1 in the history storage unit 108 in which Folder A was displayed in the foreground at a display ratio of 100%. Next, when File B is opened at 8:20:00, the operation input unit 102 stores the history shown in No. 2 in the history storage unit 108 in which Folder A was displayed in the foreground at a display ratio of 87% and File B was displayed in the foreground at a display ratio of 100%.

Next, when File C is opened at 8:25:00, the operation input unit 102 stores the history shown in No. 3 in the history storage unit 108 in which Folder A was displayed in the foreground at a display ratio of 33%, File B was displayed in the foreground at a display ratio of 89%, and File C was displayed in the foreground at a display ratio of 100%. Next, when the window for Folder A is rendered active at 8:28:00, the operation input unit 102 stores the history shown in No. 4 in the history storage unit 108 in which Folder A was displayed in the foreground at a display ratio of 100%, File B was displayed in the foreground at a display ratio of 77%, and File C was displayed in the foreground at a display ratio of 33%.

Next, when the window for Folder A is moved to a position which hides File C at 8:28:10, the operation input unit 102 stores the history shown in No. 5 in the history storage unit 108 in which Folder A was displayed in the foreground at a display ratio of 100%, File B was displayed in the foreground at a display ratio of 85%, and File C was displayed in the foreground at a display ratio of 0%. Next, when the window for Folder A is closed at 8:30:00, the operation input unit 102 stores the history shown in No. 6 in the history storage unit 108 in which Folder A was displayed in the foreground at a display ratio of 0%, File B was displayed in the foreground at a display ratio of 100%, and File C was displayed in the foreground at a display ratio of 93%. The operation input unit 102 stores the history shown in No. 7-13 in the history storage unit 108 in a similar manner.

Figure 6:
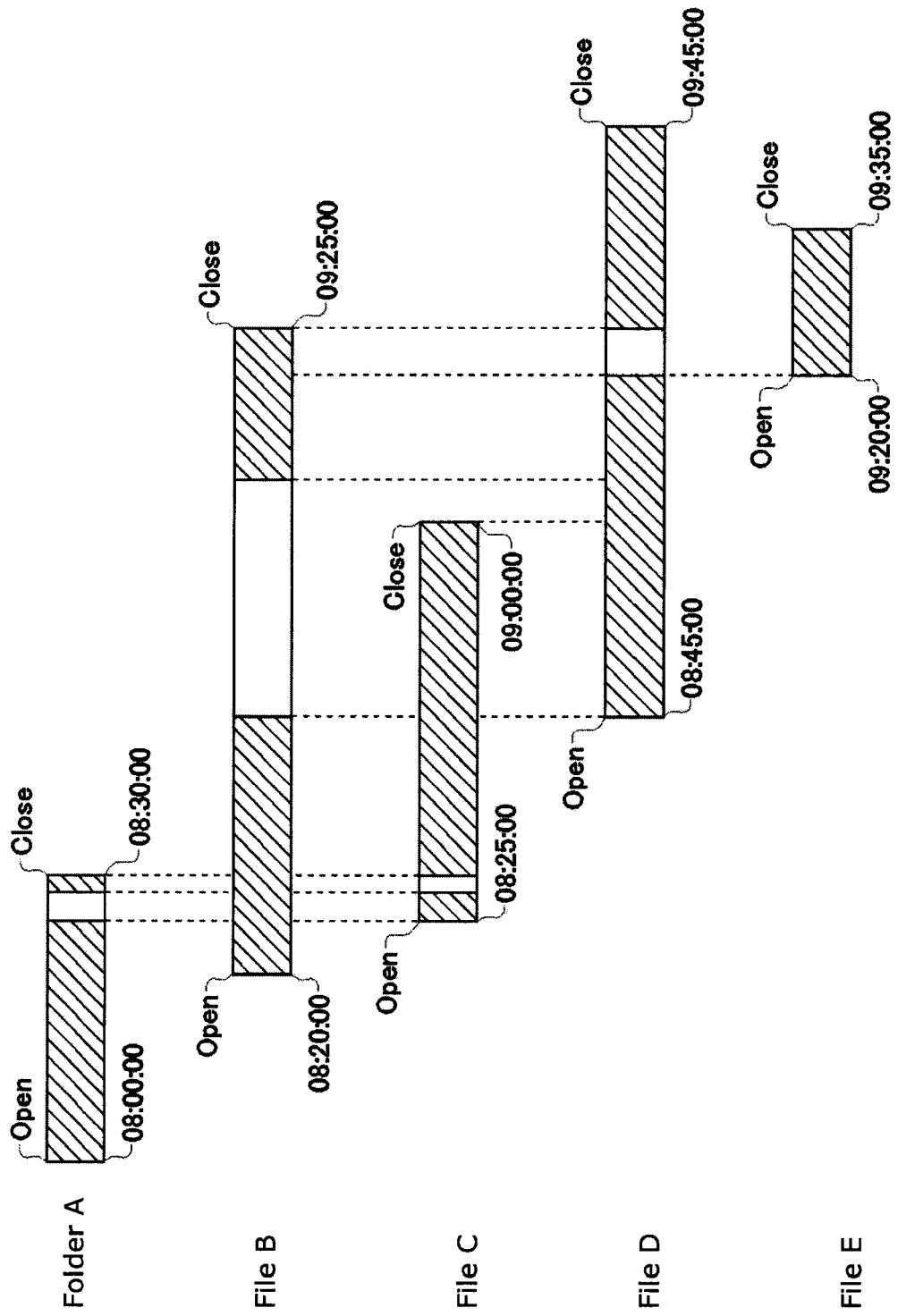
FIG. 6 shows the opening and closing times of files and folders and when the windows were displayed in the foreground according to an embodiment.

The following is an explanation of the first calculating method for calculating the first degree of relevance with reference to FIG. 6 and FIG. 7. In the first calculating method, the calculating unit 110 calculates the degree of relevance of other data units to one data unit based on the simultaneous display times for the plurality of data units during which windows were displayed on the display screen. FIG. 6 shows the opening and closing times of files and folders and when the windows were displayed in the foreground according to the history in FIG. 5.

In FIG. 6, the bar displayed on the right-hand side for Folder A and Files B through E indicates the period of time ranging from when the file or folder was opened to when the file or folder was closed. The cross-hatched regions in each bar indicate the time the window for the file or folder was displayed in the foreground of the display screen.

For example, FIG. 6 indicates that File B was opened at 08:20:00, closed at 9:25:00, and was not displayed in the foreground of the display screen for a certain period of time while open.

FIG. 7 shows an example of a first table created by the calculating unit 110 based on the history in FIG. 5. In block S116 of the flowchart shown in FIG. 2, the calculating unit 110 analyzes the history in the history storage unit 108 and creates the first table shown in FIG. 7. Each record in the first table created by the calculating unit 110 includes information on other files and folders that were displayed in the foreground of the display screen at the same time as the one file or folder.

The records created by the calculating unit 110 in the first table include the location of the one file or folder (the location on the display screen), the time the one file or folder was opened (the execution start time on the display screen), the simultaneous display times during which the windows of other files and folders were displayed in the foreground of the display screen at the same time as the one file or folder or during which the window of the one file or folder was displayed in the foreground of the display screen at the same time as the other files and folders (the files and folders were simultaneously displayed in the foreground), and the other files and folders executed after the one file or folder (subsequently opened files and folders).

For example, in Record No. xx1, the calculating unit 110 records that Folder A was opened on the desktop at 08:00:00 on 2012/0x/xx, and that File B was opened in the foreground of the display screen at the same time for 0:05:00 and 0:02:00 before Folder A was closed. The calculating unit 110 adds the created record to the first table, and stores the table in the history storage unit 108.

The upper table in FIG. 7 shows some of the records from the first table corresponding to FIG. 6 in which the time series for the files and folders created by the calculating unit 110 have been recorded. The lower table in FIG. 7 shows an extract of the records in the first table created by the calculating unit 110 corresponding only to File B. The example shown in the lower table of FIG. 7 includes records (No. yyy and No. zzz) from the first table for File B executed during other time spans than the one shown in FIG. 6 (08:00:00-09:35:00).

Here, the calculating unit 110 may determine when a window is displayed in the foreground of the display screen on condition that the window is displayed in the foreground at a ratio greater than a predetermined threshold value. For example, the calculating unit 110 may determine when a window is displayed in the foreground of the display screen on condition that the display ratio of the window for the file or folder is 100% or, alternatively, on condition that the display ratio of the window for the file or folder exceeds a predetermined threshold value.

For example, when the display ratio of a window for a file or folder is greater than 90%, 80%, 70%, 60% or 50%, the calculating unit 110 may add information on another file or folder to the record column in the first table for the display of a window in the foreground of the display screen.

The calculating unit 110 may consider all files and folders executed after the one file or folder or a predetermined number of files and folders initially executed after the one file or folder to be files and folders opened after the one file or folder.

For example, in FIG. 6, File C, File D and File E were opened after File B was opened and before File B was closed. In Record xx2 in FIG. 7, the calculating unit 110 only records File C and File D. In this way, the information processing device 100 can record data units that are relevant to the one data unit while also conserving memory resources.

In block S106 of FIG. 2, the calculating unit 110 retrieves the first table shown in the upper table of FIG. 7 from the history storage unit 108, and extracts the portion shown in the lower table of FIG. 7 corresponding to the one file or folder (for example, File B) for which display operations have been inputted. The calculating unit 110 then calculates the first degree of relevance of other files and folders to the one file or folder based on the extracted records.

For example, the calculating unit 110 may calculate the first degree of relevance by multiplying the number of times other files and folders were simultaneously displayed in the foreground of the screen along with the one file or folder by a predetermined coefficient a1, multiplying the number of times other files and folders were executed after the one file or folder by coefficient b1, and adding the products together. The calculating unit 110 may add coefficient c1 to coefficient a1 when the amount of time the window for another file or folder was simultaneously displayed in the foreground along with the one file or folder is greater than a threshold value, and subtract coefficient c1 from coefficient a1 when less than the threshold value.

The calculating unit 110 may also add up the simultaneous display times of other files in the same record. For example, Record xx2 in FIG. 7 indicates that the simultaneous display times of Folder A with File B are 0:05:00 and 0:02:00. When calculating the first degree of relevance, the calculating unit 110 may add these up and treat the time in which Folder A was simultaneously displayed in the foreground with File B as a single instance with a simultaneous display time of 0:07:00.

For example, the calculating unit 110 may calculate the first degree of relevance R1 using equation (EQ.) 1.

$$R1=(a1+c1)\times n1++(a1-c1)\times n1-+b1\times m1 \quad (EQ.\ 1)$$

(Here, n1+ is the number of files and folders with a simultaneous display time greater than the threshold value, n1− is the number of files and folders with a simultaneous display time less than the threshold value, and m1 is the number of times other files and folders were executed after the one file or folder.)

In the example shown in FIG. 7, coefficient a1=1, coefficient b1=0.2, coefficient c1=0.2, and the threshold value=0:10:00. Here, the calculation unit 110 calculates the first degree of relevance of Folder A to File B as 1.2 (record yyy)+0.8 (record xx2)=2.0, the first degree of relevance of File C to File B as 1.4 (Record xx2)+1.0 (Record zzz)=2.4, the first degree of relevance of File D to File B as 1.4 (Record xx2)+1.2 (Record zzz)=2.6, and the first degree of relevance of File E to File B as 0.8 (Record xx2)=0.8.

The calculating unit 110 may establish the maximum value in the calculated first degrees of relevance as 1, and then normalize the rest of the values. Here, the calculating unit 110 calculated the first degree of relevance of Folder A to File B as 0.77, the first degree of relevance of Folder C to File B as 0.92, the first degree of relevance of Folder D to File B as 1, and the first degree of relevance of Folder E to File B as 0.31. The calculating unit 110 may calculate the first degree of relevance by using different coefficients do for the average display ratios for the windows of other files and folders and then multiplying them by n1+ and n1−.

According to an embodiment, as explained with reference to FIG. 6 and FIG. 7, the calculating unit 110 can calculate, as one of a plurality of degrees of relevance, a first degree of relevance of other data units to one data unit based on the time during which windows for the one data unit and the other data units are simultaneously displayed in the foreground of the display screen.

Figure 8:
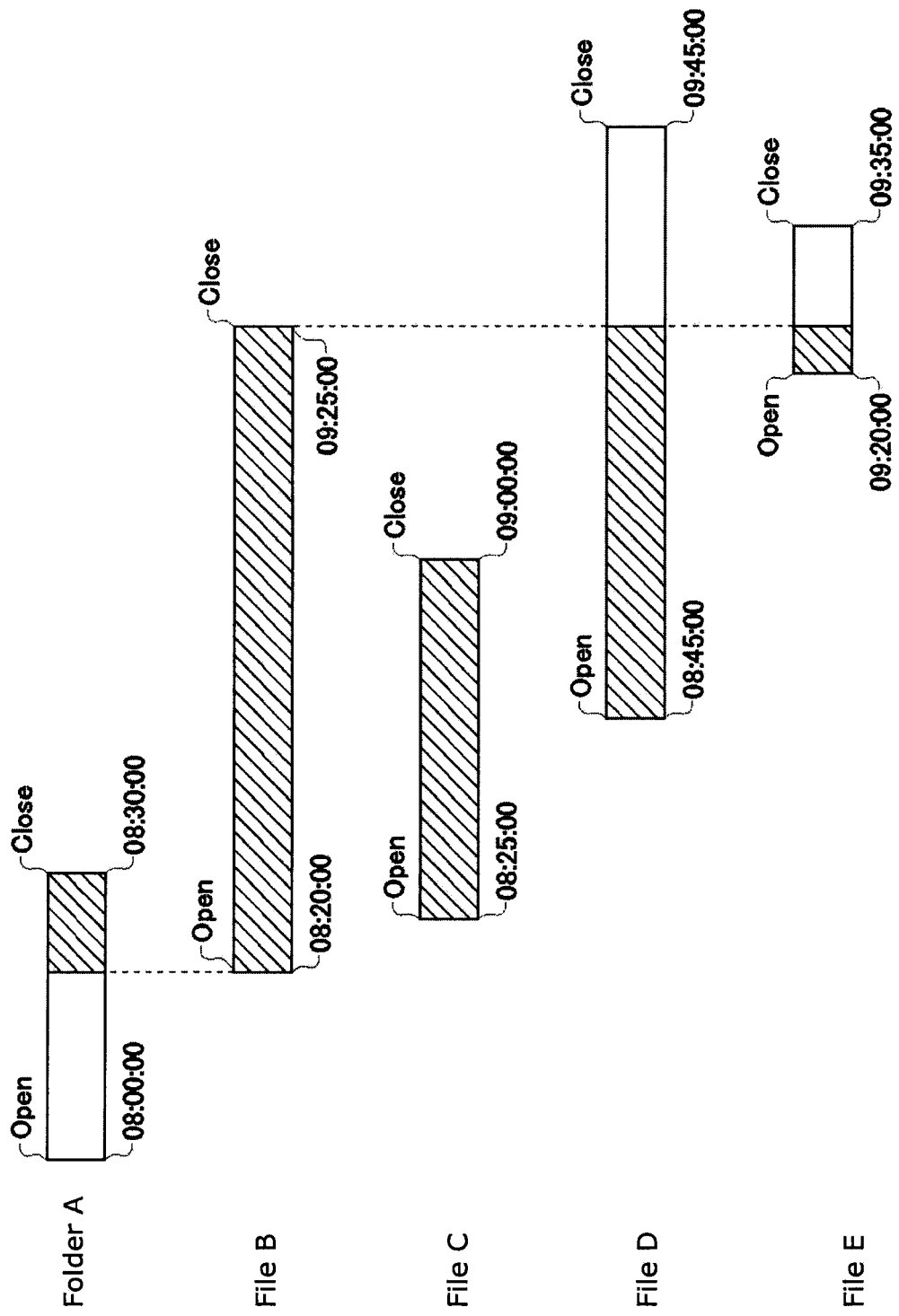
FIG. 8 shows the opening and closing times of files and folders according to an embodiment.

The following is an explanation, with reference to FIG. 8 and FIG. 9, of a second calculating method used to calculate a second degree of relevance. FIG. 8 shows the opening and closing times of files and folders. In FIG. 8, the bar displayed on the right-hand side for Folder A and Files B through E indicates the period of time ranging from when the file or folder was opened to when the file or folder was closed. The cross-hatched regions in each bar indicate the period of time ranging from when File B was opened to when File B was closed.

FIG. 8 indicates that File B was opened at 08:20:00 and closed at 9:25:00. The situation shown in FIG. 8 corresponds to the history shown in FIG. 5.

FIG. 9 shows an example of a second table created by the calculating unit 110 based on the history in FIG. 5. In block S116 of the flowchart shown in FIG. 2, the calculating unit 110 analyzes the history in the history storage unit 108 and creates the second table shown in FIG. 9. Each record in the second table created by the calculating unit 110 includes information on other files and folders that were opened at the same time as the one file or folder.

The records created by the calculating unit 110 in the second table include the location of the one file or folder (the location on the display screen), the time the one file or folder was opened (the execution start time on the display screen), the simultaneous operating times during which another file or folder was opened at the same time the one file or folder was opened and during which the window for another file or folder was open and operable at the same time as the window for the one file or folder (subsequently open files and folders), and the other files and folders executed after the one file or folder (subsequently opened files and folders).

For example, in Record No. xx1 created by calculating unit 110, it is recorded that Folder A was opened on the desktop at 08:00:00 on 2012/0x/xx, and that, until closed, Folder A was open at the same time as File B for 0:10:00 and was open at the same time as File C for 0:05:00. The calculating unit 110 adds the created record to the second table, and stores the table in the history storage unit 108.

The upper table in FIG. 9 shows some of the records from the second table corresponding to FIG. 8 in which the time series for the files and folders created by the calculating unit 110 have been recorded. The lower table in FIG. 9 shows an extract of the records in the second table created by the calculating unit 110 corresponding only to File B. The example shown in the lower table of FIG. 9 includes records (No. yyy and No. zzz) from the second table for File B executed during other time spans than the one shown in FIG. 8 (08:00:00-09:35:00).

As in the first table, the calculating unit 110 may consider a predetermined number of initially opened files and folders to be files and folders opened after the one file or folder. In this way, the information processing device 100 can record data units that are relevant to the one data unit while also conserving memory resources.

In block S106 of FIG. 2, the calculating unit 110 retrieves the second table shown in the upper table of FIG. 9 from the history storage unit 108, and extracts the portion shown in the lower table of FIG. 9 corresponding to the one file or folder (for example, File B) for which display operations have been inputted. The calculating unit 110 then calculates the second degree of relevance of other files and folders to the one file or folder based on the extracted records.

For example, the calculating unit 110 may calculate the second degree of relevance by multiplying the number of times other files and folders were open at the same time as the one file or folder by a predetermined coefficient $a_2$, multiplying the number of times other files and folders were executed after the one file or folder by coefficient $b_2$, and adding the products together. The calculating unit 110 may add coefficient $c_2$ to coefficient $a_2$ when the simultaneous operating time during which another file or folder was open at the same time as the one file or folder is greater than a threshold value, and subtract coefficient $c_2$ from coefficient $a_2$ when less than the threshold value.

The calculating unit 110 may calculate the second degree of relevance of another data unit to the one data unit based on the simultaneous operating time on condition that the simultaneous operating time exceeds a predetermined threshold value. In other words, the calculating unit 110 may exclude a record in which the time during which another file or folder was open at the same time as the one file or folder is less than the predetermined threshold value from the count for the number of times the other file or folder was open at the same time as the one file or folder. In this way, the calculating unit 110 can avoid mistakenly considering a file or folder accidentally opened for a short period of time (for example, a few seconds) to be relevant to the one file or folder.

For example, the calculating unit 110 may calculate the second degree of relevance R2 using EQ. 2.

$$R2=(a2+c2) \times n2++(a2-c2) \times n2-+b2 \times m2 \qquad (EQ. 2)$$

(Here, n2+ is the number of files and folders with a simultaneous operating time greater than the threshold value, n2− is the number of files and folders with a simultaneous operating time less than the threshold value, and m2 is the number of times other files and folders were executed after the one file or folder.)

For example, in the lower table in FIG. 9, coefficient $a_2=1$, coefficient $b_2=0.2$, coefficient $c_2=0.2$, and the threshold value=0:30:00. Here, the calculation unit 110 calculates the second degree of relevance of Folder A to File B as 1.2 (record yyy)+0.8 (record xx2)=2.0, the second degree of relevance of File C to File B as 1.4 (Record xx2)+1.4 (Record zzz)=2.8, the second degree of relevance of File D to File B as 1.4 (Record xx2)+0.8 (Record zzz)=2.2, and the second degree of relevance of File E to File B as 0.8 (Record xx2)=0.8.

The calculating unit 110 may establish the maximum value in the calculated second degrees of relevance as 1, and then normalize the rest of the values. Here, the calculating unit 110 calculates the second degree of relevance of Folder A to File B as 0.71, the second degree of relevance of Folder C to File B as 1, the second degree of relevance of Folder D to File B as 0.79, and the second degree of relevance of Folder E to File B as 0.29.

According to an embodiment, as explained with reference to FIG. 8 and FIG. 9, the calculating unit 110 can calculate, as one of a plurality of degrees of relevance, a second degree of relevance of other data units to one data unit based on the time during which windows for the one data unit and the other data units are simultaneously open and operable.

Figure 10:
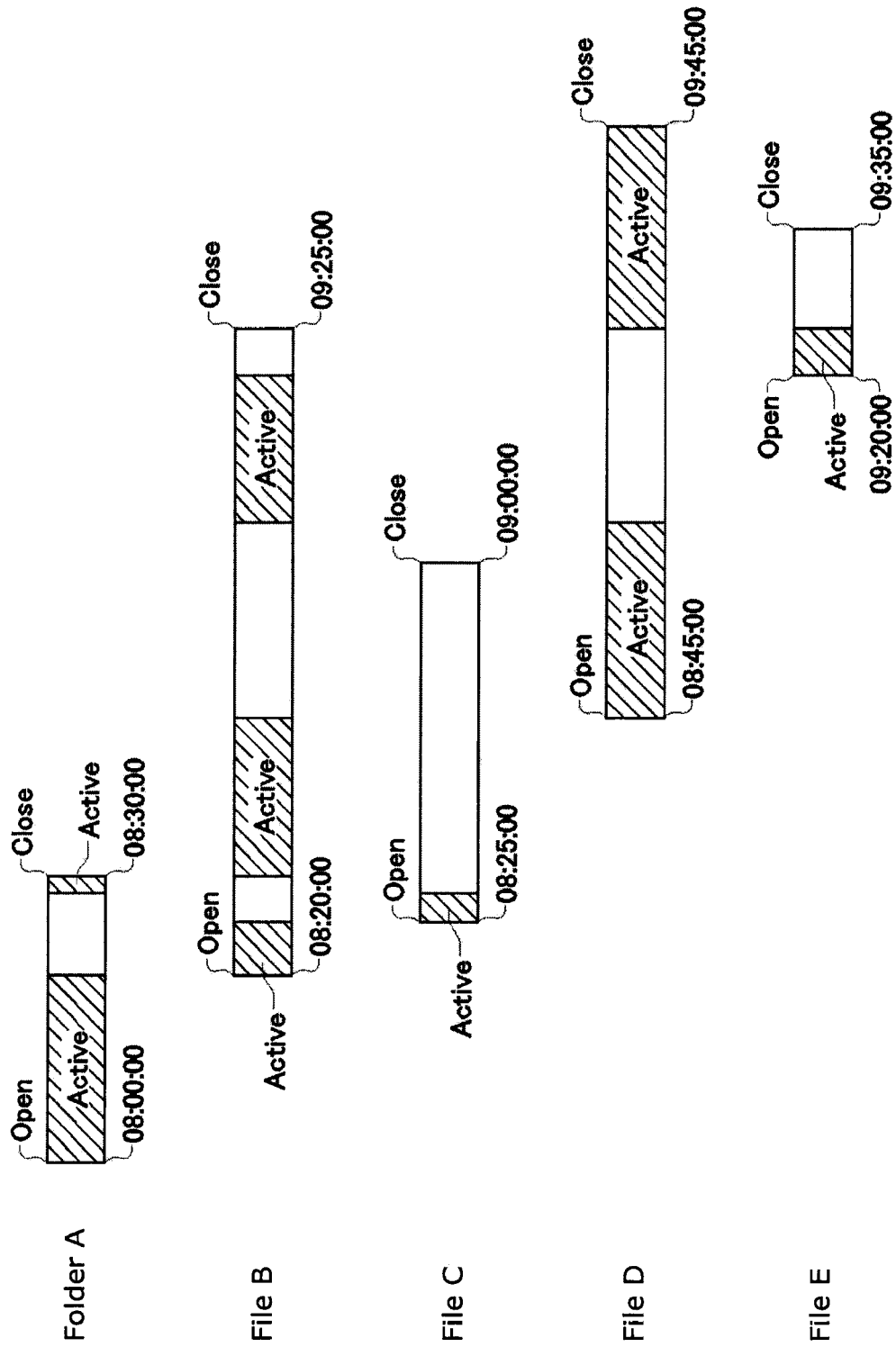
FIG. 10 shows when files and folders were opened and closed and were active according to an embodiment.

The following is an explanation, with reference to FIG. 10 and FIG. 11, of a third calculating method used to calculate a third degree of relevance. FIG. 10 shows the opened and closed states and active states of files and folders. In FIG. 10, the bar displayed on the right-hand side for Folder A and Files B through E indicates the period of time ranging from when the file or folder was opened to when the file or folder was closed. The cross-hatched regions in each bar indicate the period of time each file or folder was active.

For example, in FIG. 10, File B is opened at 08:20:00, closed at 9:25:00, and alternates between active and inactive three times during this period. The situation shown in FIG. 10 corresponds to the history shown in FIG. 5.

FIG. 11 shows an example of a third table created by the calculating unit 110 based on the history in FIG. 5. In block S116 of the flowchart shown in FIG. 2, the calculating unit 110 analyzes the history in the history storage unit 108 and creates the third table shown in FIG. 11. Each record in the third table created by the calculating unit 110 includes information on other files and folders that were active at the same time as the one file or folder.

For example, in Record No. xx1 created by calculating unit 110, it is recorded that Folder A was active on the desktop at 08:00:00 on 2012/0x/xx, and that File B and File C were subsequently active in successive order. The calculating unit 110 adds the created record to the third table, and stores the table in the history storage unit 108.

The upper table in FIG. 11 shows some of the records from the third table corresponding to FIG. 10 in which the time series for the files and folders created by the calculating unit 110 have been recorded. The lower table in FIG. 11 shows an extract of the records in the third table created by the calculating unit 110 corresponding only to File B. The example shown in the lower table of FIG. 11 includes records (No. xxx) from the third table for File B executed during other time spans than the one shown in FIG. 10 (08:00:00-09:35:00).

The records created by the calculating unit 110 in the third table include the location of the one file or folder (the location on the display screen), the time the one file or folder was active (the active time on the display screen), and a predetermined number of other files and folders that became active after the one file or folder became active (subsequently active files or folders on the display screen).

The calculating unit 110 may consider all files and folders executed after the one file or folder or a predetermined number of files and folders initially executed after the one file or folder to be files and folders that became active after the one file or folder. For example, in FIG. 10, Folder A, File B and File D became active after File C became active and while File C was still open. In Record xx3 in FIG. 11, however, the calculating unit 110 only records File A and File B. In this way, the information processing device 100 can record data units that are relevant to the one data unit while also conserving memory resources.

In block S106 of FIG. 2, the calculating unit 110 retrieves the third table shown in the upper table of FIG. 11 from the history storage unit 108, and extracts the portion shown in the lower table of FIG. 11 corresponding to the one file or folder (for example, File B) for which display operations have been inputted. The calculating unit 110 then calculates the third degree of relevance of other files and folders to the one file or folder based on the extracted records.

For example, the calculating unit 110 may calculate the third calculating unit by multiplying the number of times another file or folder became active after the one file or folder by coefficient a3_n. The value of the coefficient may be adjusted so that the impact on the third degree of relevance decreases the later a file or folder becomes active after the one file or folder.

For example, the calculating unit 110 may calculate the third degree of relevance by multiplying the number of times n3_n a file or folder became active after the one file or folder n (where n is a predetermined natural number) by coefficient a3_n (where a3_n−1≥a3_n), and adding up the n resulting values. In this way, the calculating unit 110 can increase the relative degree of relevance of a file or folder which became active immediately after the one file or folder.

For example, the calculating unit 110 calculates the third degree of relevance R3 using EQ. 3.

$$R3 = a3\_1 \times n3\_1 + a3\_2 \times n3\_2 \qquad (EQ.\ 3)$$

In the example shown in the lower table of FIG. 11, coefficient $a_{3\_1}=1.0$ and coefficient $a_{3\_2}=0.6$. Here, the calculation unit 110 calculates the degree of relevance of Folder A to File B as 1.0 (record xx2)=1.0, the degree of relevance of File C to File B as 1.0 (record xx2)+1.0 (Record xxx)=2.0, the degree of relevance of File D to File B as 1.0 (Record xx5)+ 0.6 (Record xx7)=1.6, and the degree of relevance of File E to File B as 0 (no record).

The calculating unit 110 may establish the maximum value in the calculated third degrees of relevance as 1, and then normalize the rest of the values. Here, the calculating unit 110 calculates the third degree of relevance of Folder A to File B as 0.5, the third degree of relevance of Folder C to File B as 1, the third degree of relevance of Folder D to File B as 0.80, and the third degree of relevance of Folder E to File B as 0.

According to an embodiment, as shown in FIG. 10 and FIG. 11, the calculating unit 110 can calculate the third degree of relevance of one data unit to another, as one of a plurality of degrees of relevance, based on when the other data unit became active after the one data unit.

The following is an explanation of the method used by the synthesizing unit 112 to calculate a synthesized degree of relevance based on the first through third degrees of relevance calculated by the calculating unit 110. The synthesizing unit 112 calculates the synthesized degree of relevance Rt based on the normalized first through third degrees of relevance R1-R3 and synthesis ratios e, f and g. These synthesis ratios e, f, g may be a real number between 0 and 1 (0-100%). The synthesized degree of relevance is given by EQ. 4.

$$Rt = R1 \times e + R2 \times f + R3 \times g \qquad (EQ.\ 4)$$

For example, when e=0.5 (50%), f=0.3 (30%) and g=0.2 (20%), the synthesizing unit 112 calculates a synthesized degree of relevance of Folder A to File B of 0.70, a synthesized degree of relevance of File C to File B of 0.96, a synthesized degree of relevance of File D to File B of 0.90, and a synthesized degree of relevance of File E to File B of 0.24.

Figure 12:
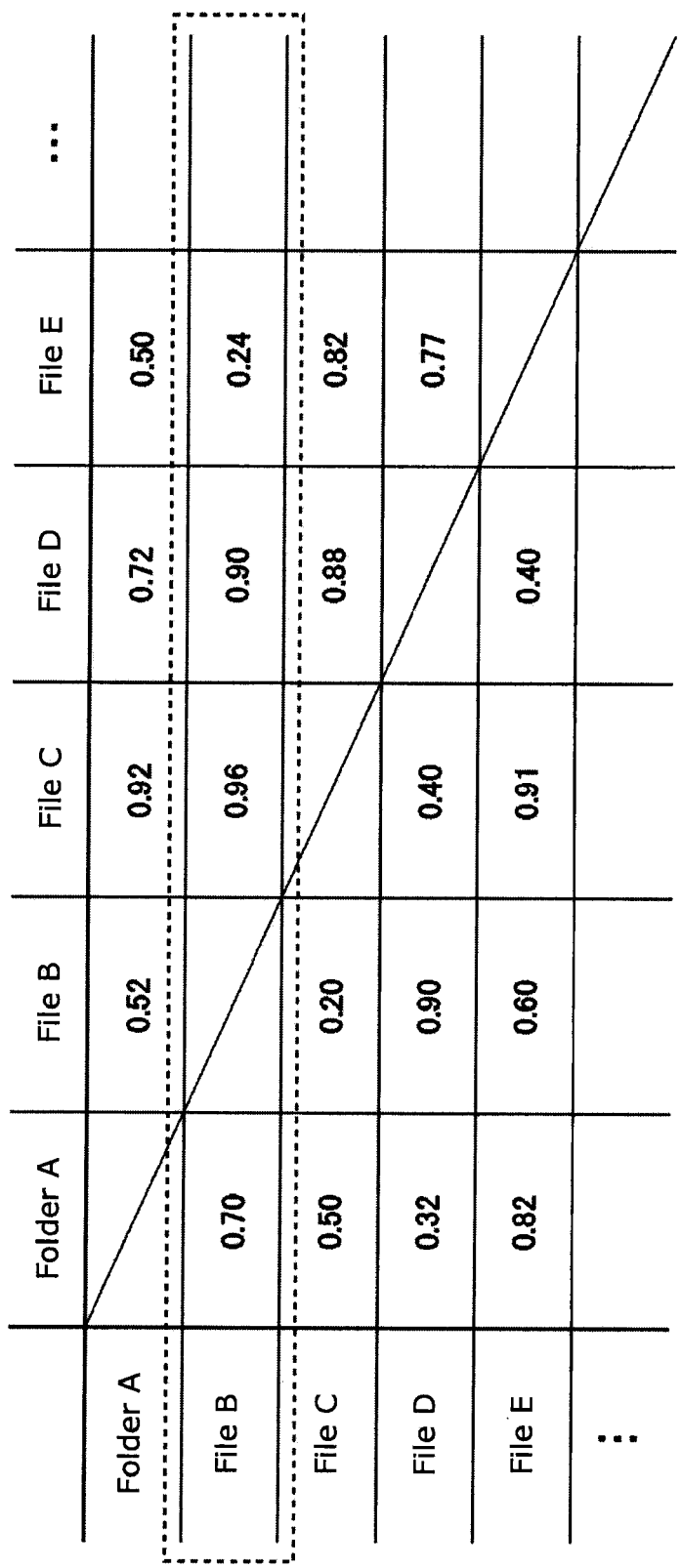
FIG. 12 shows the synthesized degree of relevance of other files and folders to the one file or folder according to an embodiment.

The following is an explanation, with reference to FIG. 12, of the method used by the display unit 114 to select another data unit with a high degree of relevance to the one data unit based on the synthesized degree of relevance. FIG. 12 shows the synthesized degree of relevance of other files and folders to the one file/folder. The vertical axis of the figure indicates the one file or folder, and the horizontal axis indicates the other files and folders.

When File B is the one file or folder, the display unit 114 selects files and folders other than File B as candidates for the other file or folder (for example, Folder A, File C, File D, File E, and so on). The display unit 114 selects a file or folder that is highly relevant to the initially opened file or folder any file or folder with a synthesized degree of relevance exceeding a predetermined standard.

For example, the display unit 114 may select Folder A, File C and File D as files and folders with a high degree of relevance to File B because their synthesized degree of relevance equals or exceeds 0.5. The display unit 114 displays icons for the selected files and folders in the input region 40 on the display screen of the display device 300.

The display unit 114 may display only one file or folder among the selected data units having a high degree of relevance to the one data unit. Here, the operation input unit 102 is used by the user to input a display setting indicating that only one file or folder is to be displayed, and this display setting is stored in the history storage unit 108. When the selected data is displayed, the display unit 114 may display files and/or folders based on the display setting retrieved from the history storage unit 108. In this way, the information processing device 100 can display only files, only folders, or both files and folders based on a user setting.

Also, the display unit 114 may display files prioritized with respect to a folder in the input region 40. Here, the synthesizing unit 112 increases the synthesized degrees of relevance of files relative to the synthesized degree of relevance of the folder in which the files are stored. For example, when File X and Folder Y just below File X are candidates for data units with a high synthetic degree of relevance, the synthetic degree of relevance of Folder Y is multiplied by a predetermined coefficient (for example, 0.5) to lower the synthetic degree of relevance of folder Y relative to File X. In this way, the information processing device 100 according to an embodiment can avoid the redundant display of a file and the folder in which the file is located.

Figure 13:
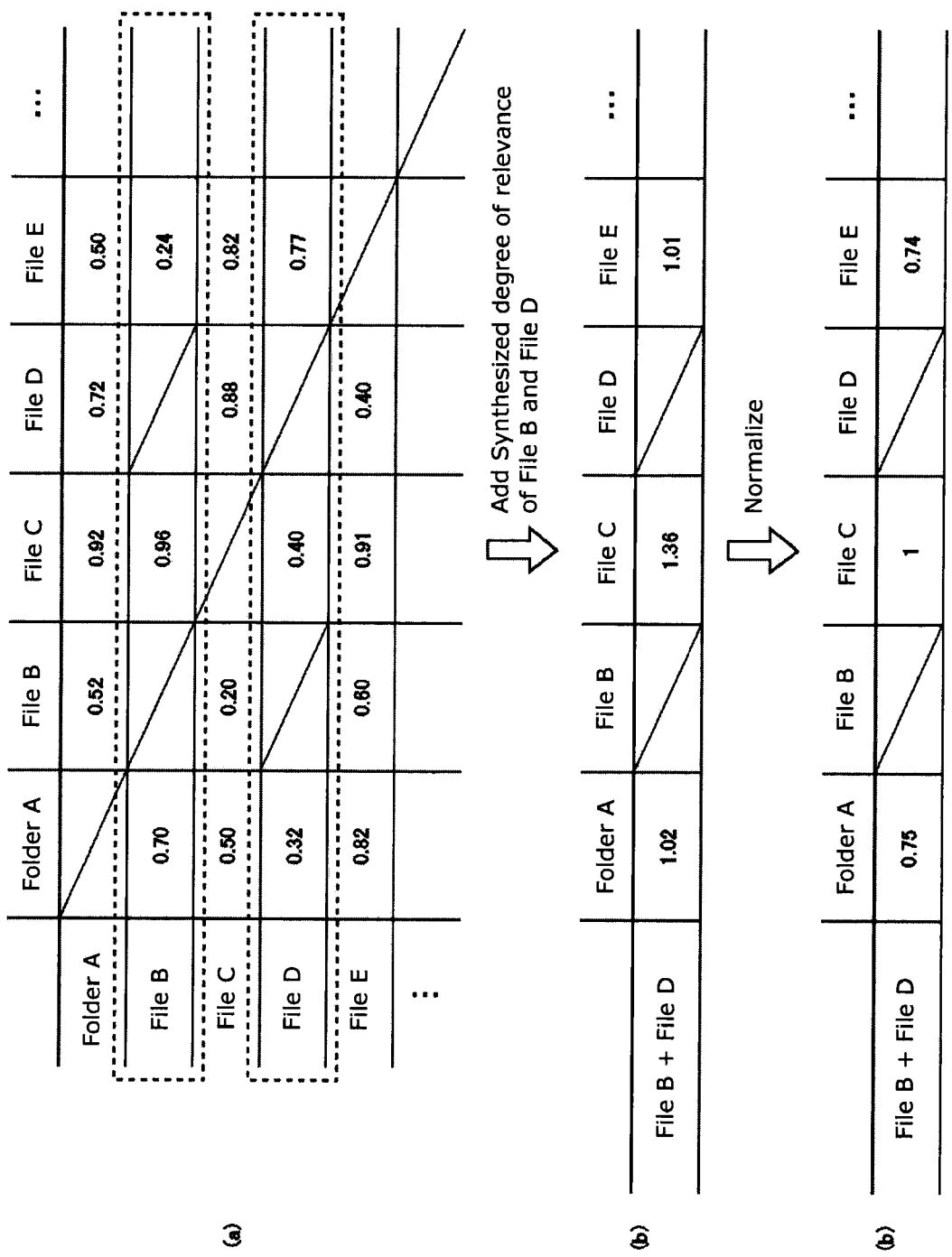
FIG. 13 shows a method for selecting two data units and other highly relevant data according to an embodiment.

The following is an explanation, with reference to FIG. 13, of a method used to select another data unit with a high degree of relevance to two data units. In other words, when the user enters a display operation for a plurality of data units using the operation input unit 102 and two files and/or folders are opened, the method explained below is used by the synthesizing unit 112 to calculate the synthesized degree of relevance of other data units to these two files and/or folders. FIG. 13 (a) shows a table with the same synthesized degrees of relevance as those in FIG. 12.

The calculating unit 110 calculates the degrees of relevance of other files and folders for each of the plurality of files and folders based on the history stored in the history storage unit 108 and using the first through third calculating methods to obtain a plurality of first through third degrees of relevance. The synthesizing unit 112 synthesizes the first through third degrees of relevance to calculate synthesized degrees of relevance for each of the other files and folders relative to the plurality of files and folders.

The synthesizing unit 112 may also add up the synthesized degrees of relevance of the other files and folders to each of the plurality of files and folders to calculate synthesized degrees of relevance of other files and folders to the plurality of files and folders. For example, when File B and File D are already open, as shown in FIG. 13 (b), the synthesizing unit 112 may calculate a synthesized degree of relevance for Folder A with respect to File B and File D of 1.02 by adding together a synthesized degree of relevance for Folder A to File B of 0.70 and a synthesized degree of relevance for Folder A to File D of 0.32. The synthesizing unit 112 may establish the maximum value in the added synthesized degrees of relevance as 1, and then normalize the rest of the values.

When adding up synthesized degrees of relevance of other files and folders to each of the plurality of files and folders, the synthesizing unit 112 may increase the weighting of the synthesized degrees of relevance for files and folders that were subsequently opened in a window. For example, when File D is opened after File B in the example shown in FIG. 13, the synthesizing unit 112 may increase the weighting of the synthesized degree of relevance 0.32 of File D relative to Folder A relative to the synthesized degree of relevance 0.70 of File B relative to Folder A before adding them together. For example, when the weighting coefficient is Rw=0.2, the synthesizing unit 112 may calculate the synthesized degrees of relevance Rt of Folder A to File B and File D prior to normalization using $0.32 \times (1+0.2) + 0.70 \times (1-0.2)$.

Figure 14:
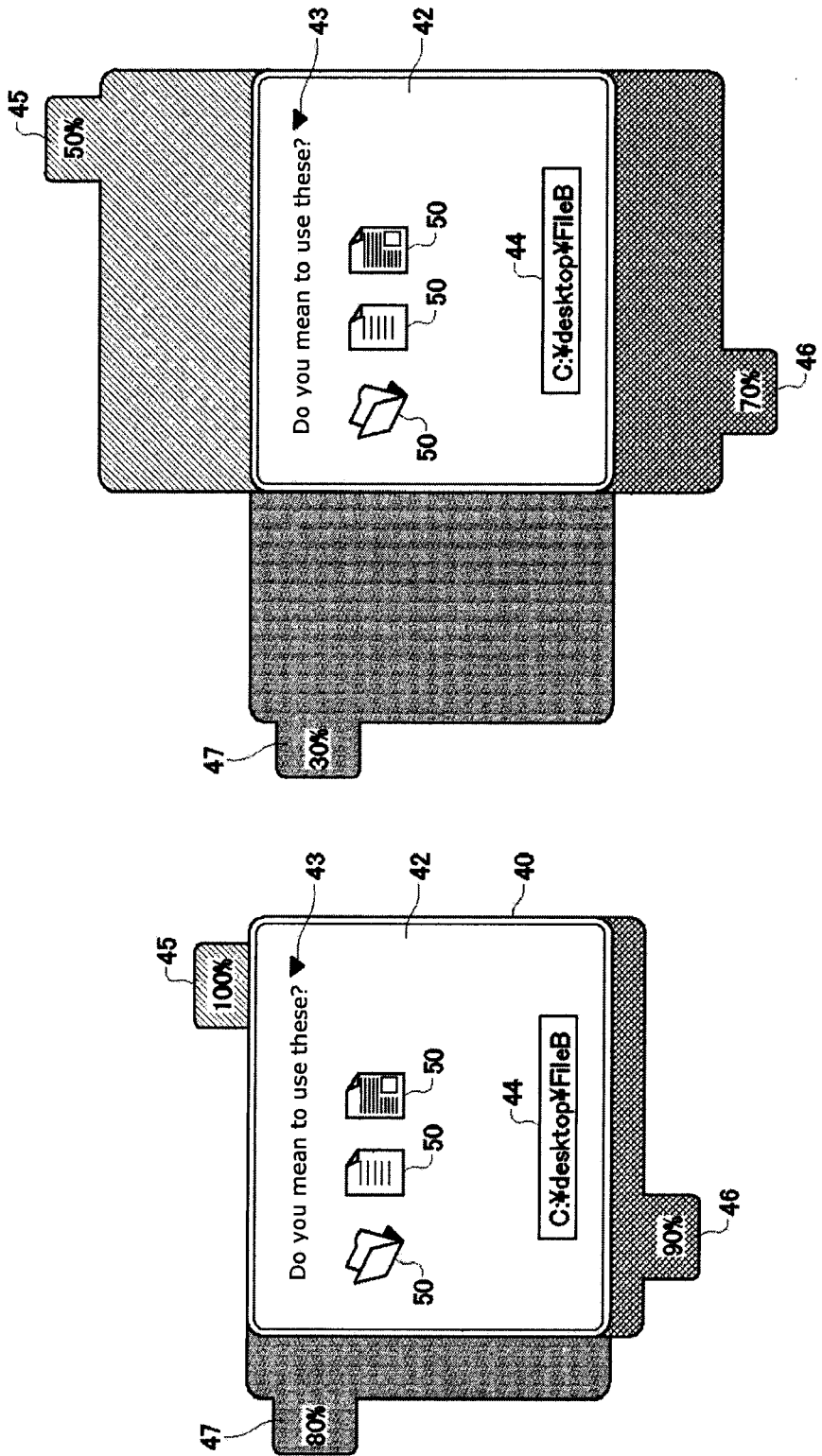
FIG. 14 shows an example of an input region panel for displaying the input region according to an embodiment.

FIG. 14 shows an example of an input region panel 42 used by the display unit 114 to display the input region 40 on the screen of the display device 300. The display unit 114 displays in the input region panel 42 icons 50 of the files and folders whose synthesized degree of relevance exceeds a predetermined standard.

The display unit 114 displays a switching button 43 on the input region panel 42. The switching button 43 is used to switch the type of data displayed on the input region panel 42. For example, when the user clicks on the switching button 43 using the operation input unit 102, the display setting in the history storage unit 108 is switched and saved. The display unit 114 retrieves the switched display setting from the history storage unit 108, and determines whether to display only files, only folders, or both files and folders in the input region panel 42 based on the display setting.

The display unit 114 displays an address display line 44 on the input region panel 42. The display unit 114 displays the address of the file or folder selected by the user in the address display line 44 of the input region panel 42.

The display unit 114 also displays for each degree of relevance a ratio display panel 45, 46, 47 in the background of the input region panel 42 that displays ratio display regions indicating the synthesis ratios e, f and g for each of the first through third degrees of relevance. For example, on the left-hand side of FIG. 14, the display unit 114 displays a synthesizing ratio e for the first degree of relevance of 1.0 (100%) in ratio display panel 45, a synthesizing ratio f for the second degree of relevance of 0.9 (90%) in ratio display panel 46, and a synthesizing ratio g for the third degree of relevance of 0.8 (80%) in ratio display panel 47.

The display unit 114 may display the synthesis ratios for the first through third degrees of relevance on the input region panel 42 based on the amount of overlap between the ratio display panels 45, 46, 47. For example, ratio display panel 45 indicating a synthesis ratio e of 100% may be displayed over the entire input region panel 42, and ratio display panel 47 indicating a synthesis ratio g of 80% may be displayed over 80% of the input region panel 42.

The user may use the operation input unit 102 to activate ratio display panel 45, 46 or 47 and adjust the amount of overlap relative to the input region panel 42. The synthesis setting unit 118 may set the synthesis ratio based on the adjusted amount of overlap, and store the result in the history storage unit 108.

As shown in from the left-hand side to the right-hand side of FIG. 14, the user may use an operation input unit 102 such as a mouse to perform a drag-and-drop operation. In response, the display unit 114 displays the pull-out operations performed on each of the ratio display panels 45, 46, 47. The synthesis setting unit 118 changes the synthesis ratios accordingly, and the display unit 114 displays icons 50 for the other files and folders in the input region panel 42 based on the changed synthesis ratios.

FIG. 15 shows an example in which the ratio display panel 47 has been collapsed. When the synthesis ratio for the degree of relevance shown in any of the ratio display panels 45, 46, 47 is less than a predetermined threshold value, the display unit 114 collapses on the side of the input region panel 42 any ratio display panel 45, 46, 47 that does not overlap with the input region panel.

For example, when the threshold value is 0.5 (50%), the display unit 114 collapses the ratio display panel 47 showing a synthesis ratio g of 30%, which is less than the threshold value. The display unit 114 may roll up the ratio display panel 47 as shown in the left-hand side in FIG. 15, or the display unit 114 may fold up the ratio display panel 47 in the manner of an accordion as shown on the right-hand side. In this way, the display unit 114 does not display the input region panel 42 with a protruding ratio display panel 47, preventing the panel from impeding operations performed by the user.

In the explanation of the present embodiment, the information system 10 used synthetic degrees of relevance from first through third degrees of relevance to present to the user other files and folders related to the file or folder opened beforehand by the user. Alternatively, the information system 10 may use only some of the first through third degrees of relevance. For example, in a modified example of the present embodiment, the display unit 114 may present to the user other data units with a high degree of relevance to the one data unit based on the first degree of relevance instead of a synthesized degree of relevance obtained by having the calculating unit 110 synthesize the first through third degree of relevance.

Figure 16:
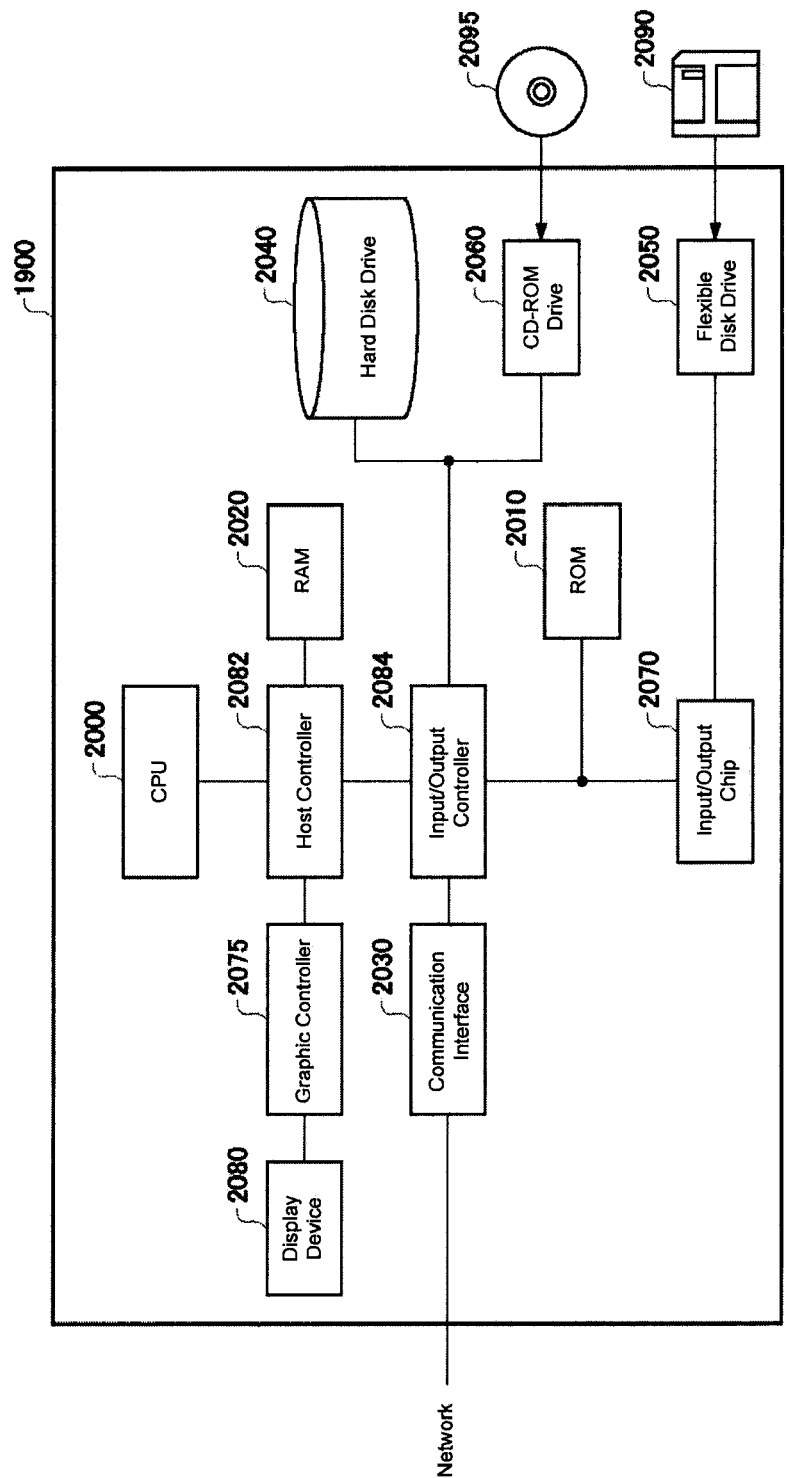
FIG. 16 shows an example of a hardware configuration for a computer according to an embodiment.

FIG. 16 shows an example of a hardware configuration for the computer 1900 serving as the information processing device 100 according to an embodiment. The computer 1900 according to an embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units. The display device 2080 may correspond to the display unit 300 according to an embodiment.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a wired or wireless network. The communication interface also functions as hardware for communicating with the outside. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000.

Programs installed in the computer 1900 to enable the computer 1900 to function as an information processing device 100 include an operation input module, executing module, history storage module, calculating module, synthesizing module, display module, number setting module, and synthesis setting module. These programs or modules may be activated by the CPU 2000 and other units to enable the computer 1900 to function as an operation input unit 102, executing unit 104, history storage unit 108, calculating unit 110, synthesizing unit 112, display unit 114, number setting unit 116, and synthesis setting unit 118.

The information processing blocks written in these programs are specific means activated by reading the programs to the computer 1900 so that the software cooperates with the various types of hardware resources described above. These specific means function as an operation input unit 102, executing unit 104, history storage unit 108, calculating unit 110, synthesizing unit 112, and display unit 114. These specific means realize operations and the processing of information in accordance with the intended purpose of the computer 1900 according to an embodiment to construct an information processing device 100 for this intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, flexible disk 2090 or CD-ROM 2095, or writes reception data received from the network to a reception buffer region of the storage device. In this way, the communication interface 2030 transfers transmitted and received data to the storage device using the DMA (Direct Memory Access) method. Alternatively, the CPU 2000 transfers transmitted and received data by reading data from the source storage device or communication interface 2030, and transfers, and writes data to the destination communication interface 2030 or storage device. A memory device such as a RAM 2020, hard disk drive 2040, flexible disk 2090 or CD-ROM 2095 may correspond to the data storage device 200 and/or history storage unit 108 according to an embodiment.

Also, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a flexible disk drive 2050 (flexible disk 2090), and performs various types of processing on the data in the RAM 2020. The CPU 2000 then writes the processed data to the external storage device via, for example, a DMA transfer. Because the RAM 2020 temporarily stores the contents of the external storage device during this process, the RAM 2020 and the external storage device are generally referred to according to an embodiment as memory, a storage unit, or a storage device. The various types of information in the various types of programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded according to an embodiment. Cache memory is included in the RAM 2020, the memory, and/or the storage device.

The CPU 2000 also performs various types of processing on data read from the RAM 2020 including the operations, processing, condition determination, and information retrieval and replacement described according to an embodiment and indicated by a sequence of instructions in the program, and writes the results to the RAM 2020. For example, when performing a condition determination, the CPU 2000 compares various types of variables described according to an embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtaining the attribute value of the second value associated with the first value satisfying a predetermined condition by reading the attribute value of the second attribute stored in the entry.

A program or module described above can be stored in a recording medium of an external unit. Instead of a flexible disk 2090 or a compact disc read only memory (CD-ROM) 2095, the recording medium can be an optical recording medium such as a digital video disc (DVD) or compact disc (CD), a magneto-optical recording medium such as a tape medium, or a semiconductor memory such as an integrated circuit (IC) card. The recording medium can also be a storage device such as a hard disk or random access memory (RAM) provided in a server system connected to a dedicated communication network or the internet, and the program can be provided to the computer 1900 via the network.

It should also be noted that the term "comprising" does not exclude other elements or blocks and "a" or "an" does not exclude a plurality. On the other side, the term "comprising" may also include the case of "consisting of". Also, elements described in association with different embodiments may be combined. It should also be noted that reference signs in the claims should not be construed as limiting elements.

The technical effects and benefits of exemplary embodiments include automatic installation and configuration of a software appliance across a variety of computing systems.

The terminology used herein is for the purpose of describing particular embodiments only and is not intended to be limiting of the claims. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

The corresponding structures, materials, acts, and equivalents of all means or block plus function elements in the claims below are intended to include any structure, material, or act for performing the function in combination with other claimed elements as specifically claimed. The description has been presented for purposes of illustration and description, but is not intended to be exhaustive or limited in the form disclosed. Many modifications and variations will be apparent to those of ordinary skill in the art without departing from the scope and spirit of the disclosure. The embodiment was chosen and described in order to best explain the principles and the practical application, and to enable others of ordinary skill in the art to understand the disclosure for various embodiments with various modifications as are suited to the particular use contemplated.

The invention claimed is:

1. An information processing device comprising:
   a processor and memory with instructions configured to perform the following units:
   a history storage unit configured to store a history of display operations on a display unit performed by a user on a first electronic file;
   an operation input unit configured to input display operations performed by the user on the first electronic file into the stored history;
   a calculating unit configured to calculate, using a plurality of calculating methods, a plurality of degrees of relevance of a second electronic file to the first electronic file based on the history stored in the history storage unit;
   a synthesizing unit configured to calculate a synthesized degree of relevance by synthesizing the plurality of degrees of relevance of the second electronic file to the first electronic file; and
   the display unit configured to display an input region for inputting display operations on the first electronic file, and to automatically display the second electronic file when the synthesized degree of relevance of the second electronic file to the first electronic file exceeds a predetermined threshold;
   wherein the display unit is further configured to display a plurality of superimposable windows corresponding to a plurality of electronic files inputted by a display operation, and wherein a first calculating method of the plurality of calculating methods of the calculating unit comprises calculating a degree of relevance between the first electronic file and the second electronic file based on simultaneous display times in which windows corresponding to the first electronic file and the second electronic file were displayed by a user operation in a foreground window during simultaneous display.

2. The information processing device according to claim 1, wherein the first electronic file comprises one of a plurality of files and folders in a filing system.

3. The information processing device according to claim 2, wherein the plurality of files and folders are stored in a computer located outside of the information processing device.

4. The information processing device according to claim 2, wherein the synthesizing unit is further configured to increase a degree of relevance of a file relative to the degree of relevance of a folder in which the file is stored.

5. The information processing device according to claim 1, wherein the first calculating method calculates the degree of relevance between the first electronic file and the second electronic file based on simultaneous display times of the first electronic file and the second electronic file in which a ratio of display in the foreground window exceeds a predetermined threshold value.

6. The information processing device according to claim 1, wherein a second calculating method of the plurality of calculating methods of the calculating unit comprises calculating the degree of relevance between the first electronic file and the second electronic file based on a simultaneous operating time in which a plurality of windows corresponding to the plurality of electronic files are available on the display unit for simultaneous operations by the user.

7. The information processing device according to claim 6, wherein the second calculating method calculates the degree of relevance between the first electronic file and the second electronic file based on the simultaneous operating time on condition that the simultaneous operating time exceeds a predetermined threshold.

8. The information processing device according to claim 1, wherein a third calculating method of the plurality of calculating methods of the calculating unit comprises calculating the degree of relevance between the first electronic file and the second electronic file based on data corresponding to a window which became active after the window corresponding to the first electronic file became active.

9. The information processing device according to claim 8, further comprising a number setting unit configured to set a number of windows used in the calculating of a degree of relevance among any successively activated windows used to manipulate other electronic files by user operations after the window used to manipulate the first electronic file is opened.

10. The information processing device according to claim 1, wherein the display unit is further configured to display a non-overlapping portion of the ratio display panel with the input region panel in a collapsed manner on the input region panel side based on a synthesizing ratio for the degree of relevance displayed in the ratio display panel being less than a predetermined threshold value.

11. The information processing device according to claim 1, wherein the operation input unit is used by the user to input display operations for a plurality of electronic files;

the calculating unit calculates a degree of relevance of each of the plurality of electronic files with the remaining plurality of electronic files using a plurality of calculating means and based on the history stored in the history storage unit to calculate a plurality of degrees of relevance;

the synthesizing unit synthesizes the plurality of degrees of relevance to calculate the synthesized degree of relevance for each of the plurality of electronic files with other electronic files; and the synthesizing unit adds up the plurality of degrees of relevance of each of the plurality of electronic files with the other electronic files to calculate the synthesized degree of relevance for each of the plurality of electronic files with the other electronic files.

12. The information processing device according to claim 11, wherein the synthesizing unit gives a greater weight to the synthesized degree of relevance calculated for an electronic file in a subsequently opened window among the plurality of electronic files, and calculates the synthesized degree of relevance of the second electronic file to the plurality of electronic files.

13. A computer program product for relevance-based information processing, the computer program product comprising a computer readable medium having computer-readable program code embodied therewith, which when executed by a computer processor, causes the computer processor to implement:

store a history of display operations performed by a user on a first electronic file;

input display operations into the stored history performed by a user on the first electronic file; calculate, using a plurality of calculating methods, a plurality of degrees of relevance of a second electronic file to the first electronic file based on the stored history;

calculate a synthesized degree of relevance by synthesizing the plurality of degrees of relevance of the second electronic file to the first electronic file; and display an input region on a hardware display for inputting display operations on the first electronic file, and automatically display the second electronic file based on the synthesized degree of relevance of the second electronic file to the first electronic file exceeding a predetermined threshold;

wherein the hardware display is further configured to display a plurality of superimposable windows corresponding to a plurality of electronic files inputted by a display operation, and wherein a first calculating method of the plurality of calculating methods of the calculating unit comprises calculating a degree of relevance between the first electronic file and the second electronic file based on simultaneous display times in which windows corresponding to the first electronic file and the second electronic file were displayed by a user operation in a foreground window during simultaneous display.

14. The computer program product according to claim 13, wherein the first electronic file comprises one of a plurality of files and folders in a filing system.

15. A method for relevance-based information processing comprising:

storing a history of display operations performed by a user on a first electronic file;

inputting display operations into the stored history performed by a user on the first electronic file;

calculating, using a plurality of calculating methods, a plurality of degrees of relevance of a second electronic file to the first electronic file based on the stored history;

calculating a synthesized degree of relevance by synthesizing the plurality of degrees of relevance of the second electronic file to the first electronic file; and displaying an input region on a display for inputting display operations on the first electronic file, and automatically displaying the second electronic file based on the synthesized degree of relevance of the second electronic file to the first electronic file exceeding a predetermined threshold.

* * * * *